United States Patent [19]
Mitani et al.

[11] Patent Number: 5,824,174
[45] Date of Patent: Oct. 20, 1998

[54] LIGHT TRANSMISSION SCREEN AND ITS MANUFACTURING METHOD

[75] Inventors: Katsuaki Mitani, Ibaraki; Hirokazu Sakaguchi, Toyonaka; Satoshi Aoki, Kadoma, all of Japan

[73] Assignee: Matsushita Electric Industrial Co., Ltd., Osaka, Japan

[21] Appl. No.: 813,542

[22] Filed: Mar. 7, 1997

Related U.S. Application Data

[62] Division of Ser. No. 390,779, Feb. 17, 1995.

[30] Foreign Application Priority Data

Mar. 11, 1994 [JP] Japan .................................. 6-041243

[51] Int. Cl.$^6$ ................................................. C03C 27/12
[52] U.S. Cl. ........................................ 156/99; 156/244.11
[58] Field of Search .......................... 156/99, 100, 244.11

[56] References Cited

U.S. PATENT DOCUMENTS

| | | | |
|---|---|---|---|
| 4,083,626 | 4/1978 | Miyahara et al. | 359/453 |
| 5,066,099 | 11/1991 | Yoshida et al. | 359/457 |
| 5,146,342 | 9/1992 | Yokoo et al. | 359/457 X |
| 5,434,706 | 7/1995 | Mitani et al. | 359/457 |
| 5,485,308 | 1/1996 | Hirata et al. | 359/457 |
| 5,587,816 | 12/1996 | Gunjima et al. | 349/62 |

FOREIGN PATENT DOCUMENTS

| | | |
|---|---|---|
| 0447603 | 9/1991 | European Pat. Off. . |
| 0450134 | 10/1991 | European Pat. Off. . |
| 0511650 | 11/1992 | European Pat. Off. . |
| 56-104162 | 7/1981 | Japan . |
| 58-59436 | 8/1983 | Japan . |
| 62-9250 | 1/1987 | Japan . |
| 5066479 | 3/1993 | Japan . |
| 5341385 | 12/1993 | Japan . |
| 6056478 | 3/1994 | Japan . |

OTHER PUBLICATIONS

European Search Report 95301551.8, dated Jun. 6, 1995.

*Primary Examiner*—Francis J. Lorin
*Attorney, Agent, or Firm*—Ratner & Prestia

[57] ABSTRACT

The present invention makes it possible to improve color shift, shading and view angles, to prevent external light absorption and reflection, to enhance external light contrast, to eliminate reflection of external images that appear on a light transmission screen's face plate, and to provide distinct pictures free of the adverse effects of dust. The light transmission screen disclosed by the present invention comprises a Fresnel lens sheet, a transparent lenticular lens sheet arranged on the Fresnel lens sheet's radiant light side and a front diffusion panel formed of a thin diffusion layer and a transparent layer and arranged on the lenticular lens sheet's light radiant side.

4 Claims, 11 Drawing Sheets

HORIZONTAL CENTER POINT

LIGHT TRANSMISSION SCREEN AND ITS MANUFACTURING METHOD

This application is a division of application Ser. No. 08/390,779, filed Feb. 17, 1995.

FIELD OF THE INVENTION

The present invention relates to a light transmission screen for use in projection type television receivers.

BACKGROUND OF THE INVENTION

Figure 17:
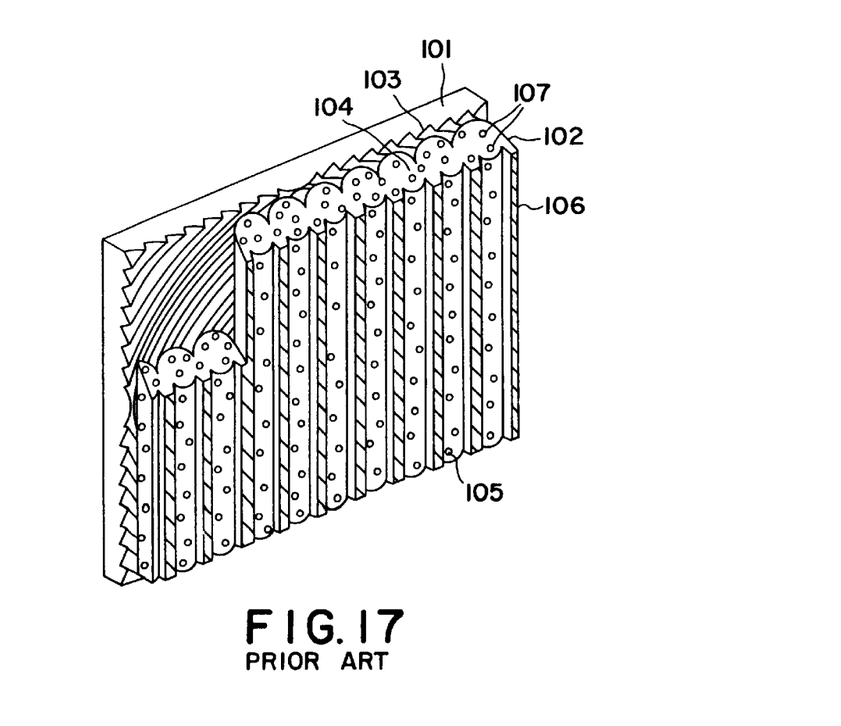
FIG. 17 is a perspective view to show structures of a prior art light transmission screen.

One example of the prior art relative to light transmission screens is disclosed in Japanese Published Unexamined Patent Application No. 59436/83. Its structure is illustrated in FIG. 17. FIG. 17 shows a screen with a two-sheet structure comprising a Fresnel lens sheet 101, which has Fresnel lenses 103 formed therein, and a lenticular lens sheet 102, which has incident light side lenticular lenses 104 and radiant light side lenticular lenses 105 formed therein, both being put together so that the latter is arranged on the front surface of the former. The basic material of the lenticular lens sheet 102 contains fine particles of light diffusing material 107 and also has its surface covered with a light absorption layer 106.

The incident light side lenticular lenses 104 contribute to expanding the horizontal view angle and the radiant light side lenticular lenses 105 improve the color shift and color shading.

However, the foregoing structure presents inherent problems of color shift and unevenness in color. The Japanese Published Unexamined Patent Application No. 9250/87 (no drawings are shown here), as well as others, were intended to solve the above problems. The fundamental structure of the Published Unexamined Patent Application No. 9250/87 is the same as shown in FIG. 17 except for having different configurations in the light absorption layer 106 between the middle portions and the right and left end portions.

Figure 18:
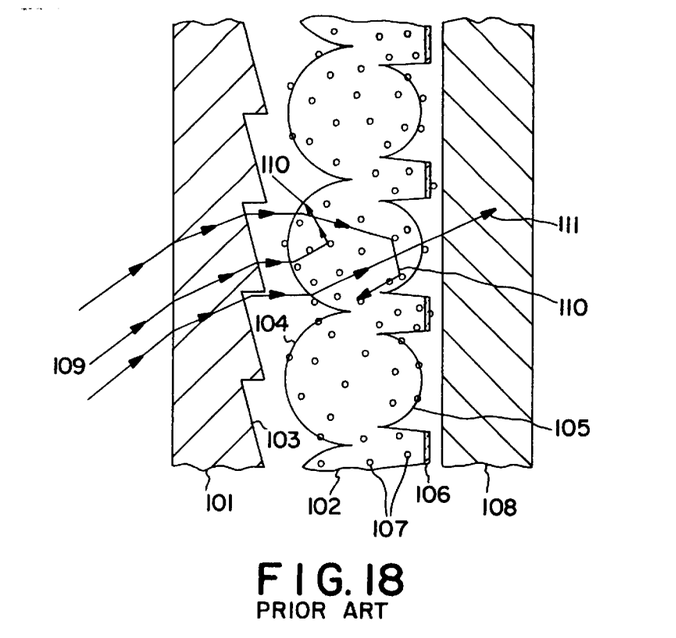
FIG. 18 is a cross-sectional view to show structures of a prior art light transmission screen and explain how light passes.
Figure 19:
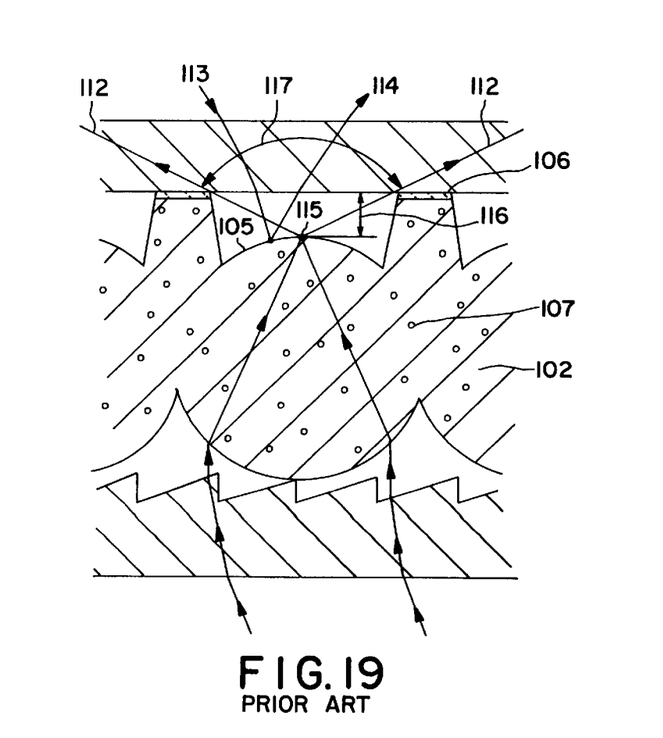
FIG. 19 is an illustration to explain the limitations involved with horizontal view angles of a prior art light transmission screen.

Also, a light transmission screen with a three-sheet structure has been proposed for the purpose of further improving picture quality as well as picture contrast. FIG. 18 is a cross-sectional view of the important portions of the prior art light transmission screen having a three-sheet structure, and FIG. 19 is an illustration to explain the limitations involved with the view angle of the prior art screen. In FIG. 18, a filter 108 or a smoked panel (not shown in FIG. 18) is arranged in front of the lenticular lens sheet 102.

The incident light 109 is divided into diffused reflection light 110 and transmission light beams 111. Light diffusing fine particles 107 (referred to as diffusion material hereafter) are mixed into the basic material of the foregoing lenticular lens sheet 102 in order to expand the vertical view angle, and cylindrical lenticular lenses 104 and 105 are formed on each respective surface thereof for image focusing.

Further, in order to prevent picture contrast from degrading due to external light, the non-focusing areas of the radiant light side lenticular lenses 105 are covered with a pattern of black stripes. Each stripe is composed of a projected external light absorption layer 106, and the stripes are arranged in a pattern having a specified uniform spacing between stripes.

A diffusion material 107 is mixed into the lenticular lens sheet 102 according to the aforementioned Published Unexamined Patent Applications No. 59436/83 and No. 9250/87. As a result, as shown in FIG. 18, all the incident light 109 does not get transmitted as the transmission light. A part of the incident light 109 is diffused by the diffusion material 107, thereby producing stray light such as the diffused reflection light 110. Thus, a deterioration in the resolution power and dissipation in the amount of radiant light result, thereby bringing about the problem of reduced brightness.

Further, according to the Published Unexamined Patent Application No. 59436/83, the incident light 109 is partially changed to diffused reflection light 110 during its passage through the incident light side lenticular lenses 104 due to the existence of the diffusion material 107, and fails to focus completely at the radiant light side lenticular lenses 105 (See FIG. 18). Consequently, the radiant light side lenticular lenses 105 usually end up utilizing only about 70% of the incident light 109.

The fundamental structure and lens design of the Published Unexamined Patent Application No. 9250/87 is the same as above. Therefore, some light not expected from the design is radiated due to the diffusion material 107, resulting in adverse effects in the improvements in color shift and color shading.

In addition, as observed in FIG. 19, there is a difference in height 116 between the incident light side lenticular lenses 105 and the projected external light absorption layer 106 of the non-focusing area. As a result, all the radiating light beams, situated outside of the radiating light 112, that hit the edge of the projected external light absorption layer 106 are blocked by the edge. This yields a picture image 115 focused on the diffusion material 107 that is difficult to see by a viewer who is watching the screen either at the far right or far left position. Accordingly, there is a certain limitation in expanding the horizontal view angle 117.

Furthermore, some of the diffusion material 107 is exposed on the surfaces of the cylindrical lenticular lenses 105 and external light absorption layer 106. Because of this, the surface of the lenticular lens sheet 102 is uneven, and when external light 113 is irradiated on the radiant light side surface of the lenticular lens sheet 102, an external light reflection 114 takes place, thereby causing the screen to look whitish with a resultant problem of deteriorated contrast.

Further, as shown in FIG. 18, a light absorbing filter 108 made of glass or plastic yielding reduced light transmittance is provided for the purposes of improving the picture brilliance and the picture contrast that have been degraded due to external light. In this case, however, the contrast affected by external light may be improved, but the fundamental problems involving color shift, color shading and narrow view angles still remain to be solved.

SUMMARY OF THE INVENTION

The present invention provides a light transmission screen, which has been improved in contrast, color shift and color shading, expanded in horizontal view angles and also enhanced in picture resolution.

The light transmission screen of the present invention comprises:

a Fresnel lens sheet;

a lenticular lens sheet arranged on the radiant light side of the foregoing Fresnel lens sheet; and a front diffusion panel, which is comprised of a diffusion layer and a transparent layer, arranged on the radiant light side of the above lenticular lens sheet.

The aforementioned diffusion layer is a thin layer formed of light diffusing fine particles. The diffusion layer can also be made of, for example, light diffusing fine particles and a binding material. It is also possible that the diffusion layer is made of a resin and light diffusing fine particles dispersed in the foregoing resin.

Each respective member of the foregoing two sheets and one panel is assigned specific functions which are combined together to perform as one complete screen. More specifically, due to the structure of a front diffusion panel formed of two layers, a diffusion layer containing a diffusion material and a transparent layer, that is arranged on the radiant light side which is closest to a viewer, the lenticular lenses can be made transparent without requiring any diffusion material to be contained in the lenticular lens sheet. Accordingly, almost 100%. of the light incident on the incident light side lenticular lenses is focused at the vicinity of the radiant light side lenticular lenses. As a result, improvements are made in color shift, shading and directivity, and also the gain is enhanced due to reduced light dissipation.

Because of the existence of the diffusion layer, it is possible to focus picture images free of the stray light caused by diffused reflection, thereby enhancing the picture resolution. In addition, since the diffusion layer can be made thin, it is possible to achieve a horizontal view angle of close to 180°, thus expanding the horizontal view angle greatly.

Also, the use of a transparent layer contributes to improvement in the clearness of picture images.

Furthermore, it is no longer necessary to prepare a variety of lenticular lenses to meet the individual specifications for each respective projection television receiver. This results in a reduction of investments in molding dies and an increase in productivity. Consequently, an overall cost reduction has been made possible. Of course, the performance is specifications for screens can be readily modified to cope with changes in marketing requirements.

In addition, the transparent lenticular sheet does not require any exchanges of molding dies and mixture adjustments for the diffusion material and light absorption material, thereby facilitating the production of the lenticular sheet and contributing to a cost reduction.

It is also possible to employ structures wherein either a black material presenting a nearly uniform light absorption spectrum in the visible light wavelength region or a visible light absorption material having selective wavelength characteristics is contained in at least one of the diffusion layer or the transparent layer of the front diffusion panel. According to the foregoing structures, light absorption in the visible light wavelength region can be enhanced, resulting in improvement of contrast against external light. At this time, coloring matter, dye, pigment, carbon, metal salt and the like can be used as the material for absorbing visible light. The contrast against external light can also be improved by dying the diffusion material a specified color.

The absorption spectrum of the foregoing visible light absorption material will not necessarily be flat, and may show some wavelength curves or peaks depending on the intended purposes such as improvements in the intensity ratio and color purity enhancement of the tri-color cathode-ray tube (CRT) used in projection television receivers.

It is also possible to employ structures wherein the surface of the Fresnel lens sheet or diffusion panel is covered with an antistatic film or layer, or provided with antistatic means utilizing an antistatic material, a plastic plate containing an antistatic agent or the like. With the use of antistatic means as mentioned above, deposition of dust and dirt inside of the screen, where easy access for cleaning is not possible, does not occur. As a result, the blurring of pictures on the screen due to dust and dirt is eliminated, thereby gaining more distinct pictures.

Further, it is possible to employ structures wherein the surface of the Fresnel lens sheet or front diffusion panel is covered with an antireflection film or layer, or provided with such antireflection means as an antireflection coating and the like. With the use of antireflection means as above, the screen's transmittance is enhanced, resulting in an increase of brightness by about 10%. Moreover, because of the reduced external light reflection, the contrast against external light is improved by about 15%, and pictures with little reflection appearing on the screen surface, thereby making them more pleasant to view, are realized.

The front diffusion panel, antistatic means and antireflection means can be produced by conventional production methods without any special methods required, therefore these can be produced at a lower cost.

It is also possible to employ structures wherein an external light absorbing layer is disposed on the surface of the lenticular lens sheet at a specified place. As a result, the vertical stripes formed on the lenticular lens sheet and external light absorbing layer are not seen by a viewer, thereby enhancing the clearness of the transparent layer and producing bright pictures of high resolution. The external absorbing layer can be formed, for example, in a pattern where black stripes are arranged at equal distances from one another.

It is additionally made possible to increase the gain of the front diffusion panel and narrow the vertical view angle by just reducing the diffusion material content in the diffusion layer. Conversely, if the diffusion material content in the diffusion layer is increased, the gain is reduced and the vertical view angle is expanded.

DETAILED DESCRIPTION OF THE INVENTION

Details of the light transmission screen of the present invention are explained according to the following exemplary embodiments:

EXAMPLE 1

Figure 1:
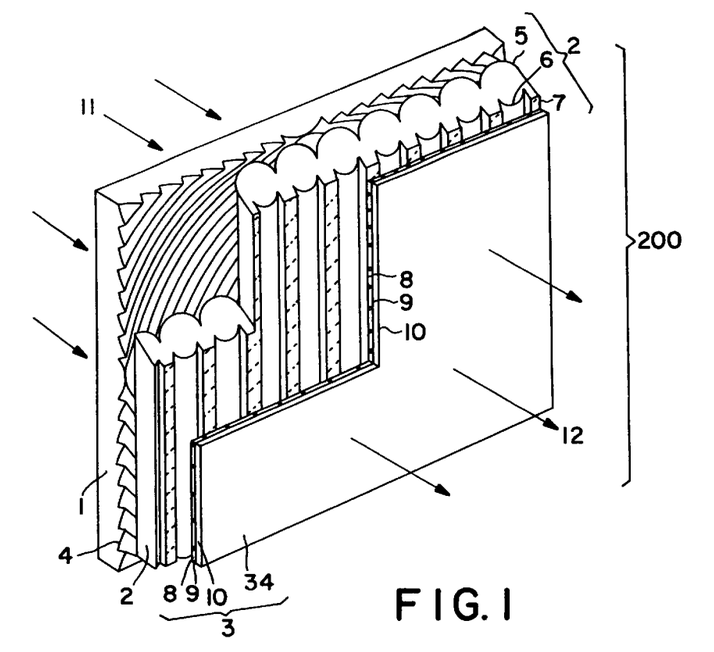
FIG. 1 is a perspective view to show structures of a light transmission screen as a first exemplary embodiment (Example 1) of the present invention.
Figure 2:
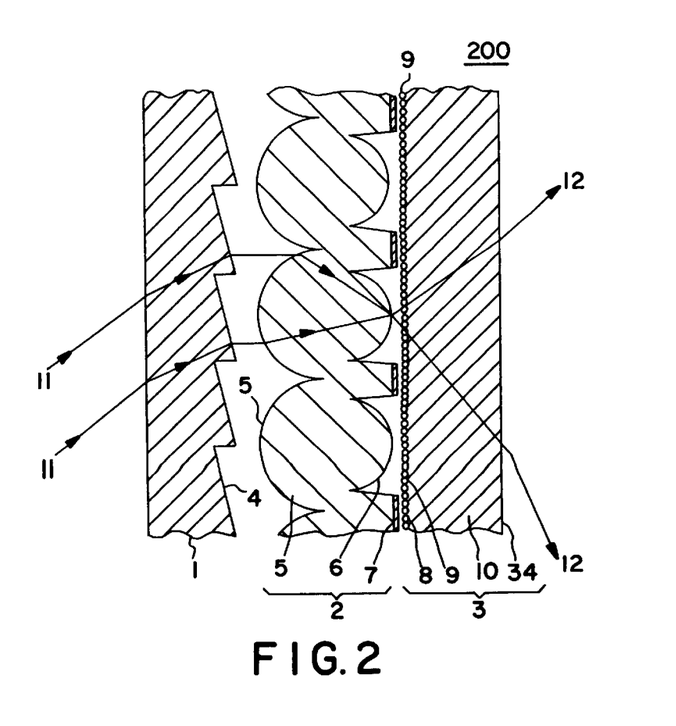
FIG. 2 is a cross-sectional view of FIG. 1.
Figure 3:
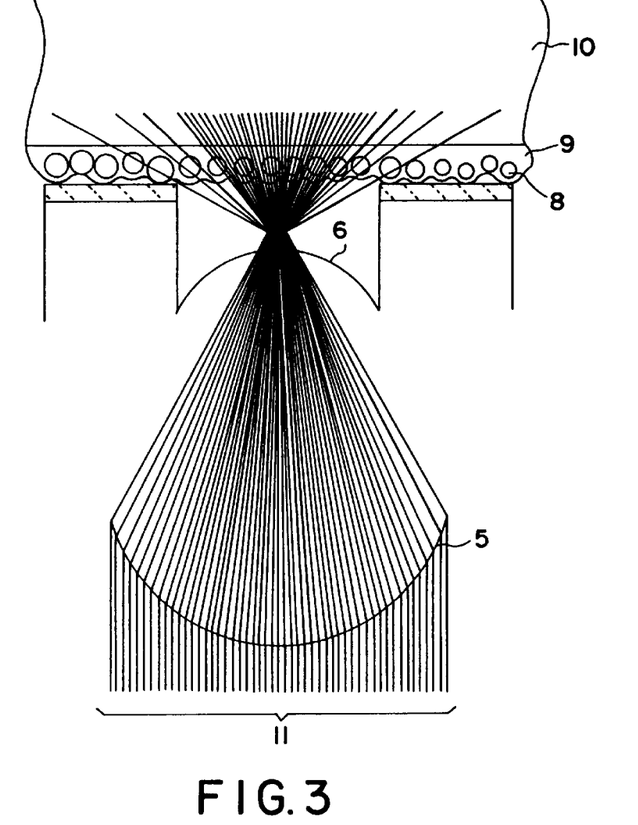
FIG. 3 is a tracing diagram of light rays drawn with respect to a lenticular lens of Example 1.

A first exemplary embodiment of the present invention of a light transmission screen is explained through FIG. 1 to FIG. 11. FIG. 1 is a perspective view to show structures of a light transmission screen as a first exemplary embodiment (Example 1) of the present invention, and FIG. 2 is a cross-sectional view of an important section of FIG. 1.

A light transmission screen 200 is formed of three elements: a Fresnel lens sheet 1 arranged on the incident light side of the light transmission screen 200, a transparent lenticular lens sheet 2 arranged on the radiant light side of the Fresnel lens sheet 1, and a front diffusion panel 3. The front diffusion panel 3 is comprised of two layers, a diffusion layer 9 containing a light diffusion material 8 and a transparent layer 10, and is arranged on the radiant light side of the lenticular lens sheet 2.

The diffusion layer 9 is disposed on a radiant light side that is closest to a viewer. Fresnel lenses 4 having a specified configuration are formed on the radiant light side of the Fresnel lens sheet 1. Incident light side lenticular lenses 5 having a specified configuration are formed on the incident light side of the lenticular lens sheet 2 and radiant light side lenticular lenses 6 having a specified configuration are formed on the radiant light side thereof. Furthermore, an external light absorption layer 7 is formed on the surface of the radiant light side lenticular lenses 6 in a black stripe pattern.

Light rays first pass through the light transmission screen 200 as incident light 11 and then get to the eyes of a viewer as radiant light 12.

The Fresnel lens sheet 1 is formed of, for example, acrylic resin, polycarbonate or the like. The lenticular lens sheet 2 is formed of a transparent resin material such as, for example, acrylic resin, polycarbonate or the like, containing no diffusion materials. The front diffusion panel 3 has its principal surface 34, which is closest to a viewer watching the transparent layer 10, made glossy.

Figure 16:
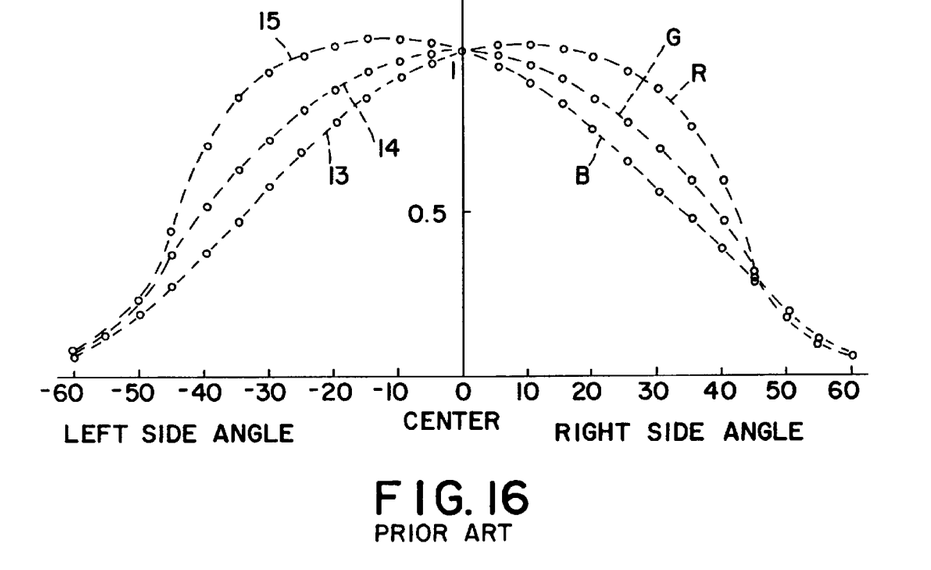
FIG. 16 is a diagram to show brightness vs. view angle curves for red, green and blue, observed with the use of a prior art light transmission screen.

According to the prior art structures as shown in FIG. 17 to FIG. 19, a diffusion material 107 corresponding to the light diffusion material 8 of the present invention is contained in a lenticular sheet 102 by dispersion, and about 30% of the incident light 109 is reflected diffusingly and becomes diffused reflection light (stray light) 111. FIG. 16, shows the performance of the lenticular lens. According to FIG. 16, when the respective brightness curves for red (R), green (G) and blue (B) (referred to as R curve, G curve and B curve hereafter) are compared with one another, the red curve 13 as well as the blue curve 15 show large changes with respect to the green curve 14. In other words, the color shift (R/B ratio) of both of the above is large as illustrated with the prior art curve 16 of FIG. 5.

However, according to the structures of the present example, almost the entire incident light 11 passes through the incident light side lenticular lenses 5, becomes radiant light and focuses on the surface of the radiant light side lenticular lenses 6. As a result, the lenses perform to their fullest extent, thereby enabling the color shift adjustment to be made closest to the designed value.

Figure 4:
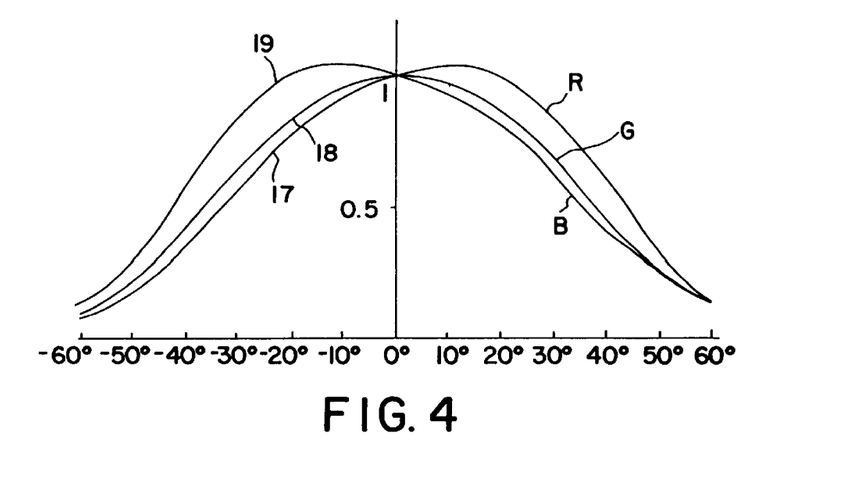
FIG. 4 is a diagram to show brightness vs. view angle curves for red, green and blue, observed with the use of the light transmission screen of Example 1.

With the present exemplary embodiment's structures, the respective brightness curves of R, G and B show that the changes in the red curve 17 and blue curve 19 are small in comparison with the changes in the green curve 18, as observed in FIG. 4.

Figure 5:
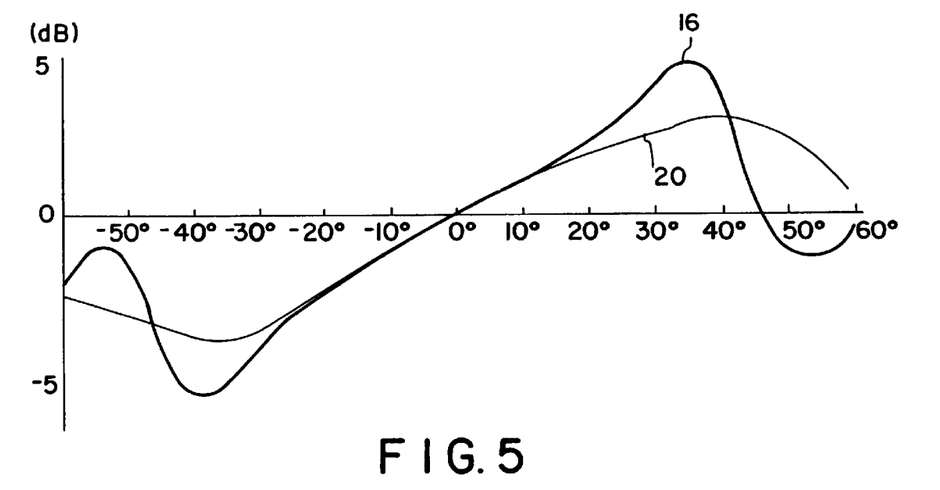
FIG. 5 is a comparison data diagram to show how the color shift is improved with the use of the light transmission screen of Example 1.

The color shift of the first exemplary embodiment is indicated by the color shift curve 20 of FIG. 5 and is reduced to almost one half when compared with the prior art color shift curve 16, thereby exhibiting a remarkable effect.

Particularly, although steep changes in the color shift curve 16 are observed at about ±15° and beyond with the prior art screen structures, the present example's structures show gradual changes at all angles, and any color shift is hardly recognizable by human eyes.

Thus far, the design of radiant light side lenticular lenses for achieving a successful color shift adjustment has been made through trial and error due to the existence of stray light caused by a diffusion material. However, in the case of the present example's transparent lenticular lenses, a color shift that is very close to the desired design value can be readily realized, resulting in various advantages such as expanded freedom in designing, a shortened period of development, a reduction in prototype production cost, and the like.

Figure 6:
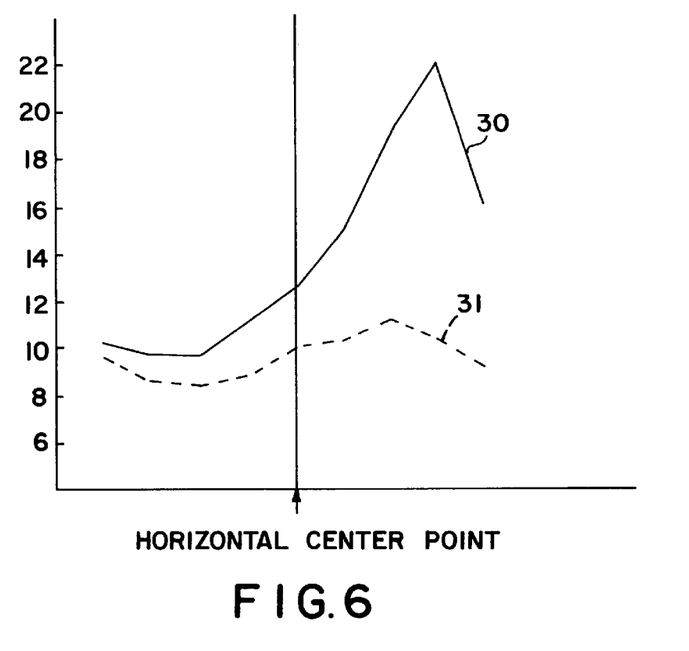
FIG. 6 is a comparison data diagram to show how the shading is improved with the use of the light transmission screen of Example 1.

As a matter of course, a reduction in color shift leads to a decrease in color shading which takes place when viewed from the front of the screen. Measurement results of color shading are shown in FIG. 6. The prior art color shading curve 30 shows a color temperature differential of as much as 12000° K. between the extremes of right and left. Contrastingly, the color shading curve 31 of the present example shows a color temperature differential of only about 3000° K., which is much smaller than that of the prior art. As a result, compensation through an electrical circuit can be achieved very easily.

A diffusion layer 9 is comprised of a diffusion material 8, which enables light to focus or diffuse. A thinner diffusion layer is preferred. As the thickness of the diffusion layer 9 decreases, the image resolution becomes more enhanced.

For example, when the thickness of the diffusion layer 9 is reduced below about 400 $\mu$m, the image resolution starts to improve. The effect of the thinner diffusion layer is multiplied as the thickness of it decreases. A more desirable effect is expected in the range of about 0.1 $\mu$m to 200 $\mu$m. The effect contributing to the enhancement of image resolution becomes minimal with a diffusion layer thickness greater than about 400 µm.

It is more desirable to form the diffusion layer 9 from a diffusion material 8 and a binding material. The diffusion material 8 consists of spherical light diffusing fine particles of about 0.1 µm to 50 µm in diameter, formed of a transparent resin material or a transparent inorganic material. Transparent materials are particularly preferred in the composition of a diffusion material 8. Although there are no particular restrictions imposed on the binding material, materials that contribute to the attachment of the diffusion material 8 to the transparent layer 10 are usually used. Such materials include, for example, acrylic resin, polycarbonate, polyester and the like.

In a cross-sectional view of the first exemplary embodiment as illustrated in FIG. 2, the diffusion layer 9 is formed on the incident light side principal surface of the front diffusion panel 3 by disposing the diffusion material 8 uniformly. The thickness of the diffusion layer 9 is equal to the diameter of one particle of the diffusion material 8 formed in fine particles, each of which does not exceed about 30 µm in diameter. Note that when the particle diameter of the diffusion material 8 ranges from about 1 to 10 µm, the picture brightness and resolution are improved significantly. In other words, the picture brightness and resolution are greatly improved with the diffusion material 8 of particle diameters ranging from about 1 to 20 µm. Also, there is great improvement with the particle diameters ranging from about 10 to 30 µm.

According to the foregoing structures, the light transmission is enhanced and both the vertical directivity and the horizontal directivity are improved without lowering the screen gain.

Figure 8:
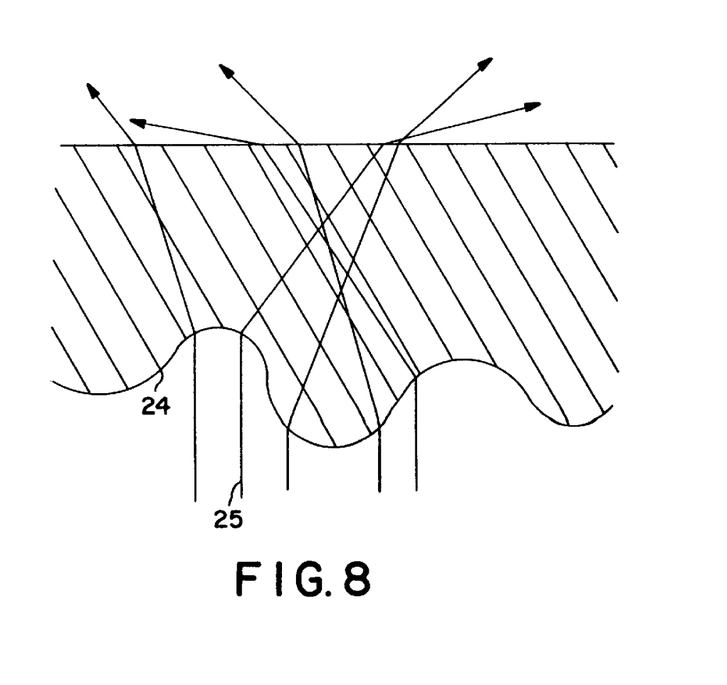
FIG. 8 is an illustration to explain theoretically how light rays pass from the diffusion surface to the flat surface with the use of the transmission screen of Example 1.

The reasons for the above include the following:

When light proceeds through the air into a transparent substance and the incidence angle is large, total reflection takes place and the light is not transmitted through the transparent substance. There is a theory which holds that the direction of the maximum diffusion of transmitted light is in the direction of a tangent to the interface. According to this theory, as illustrated in FIG. 8, when incident light 25 proceeds through a diffusion surface 24, total reflection of the incident light 25 does not take place and the radiance angle of the diffusion light tends to become large, resulting in increased transmittance and haze. Conversely, as illustrated in FIG. 9, when a diffusion surface 26 is formed on the radiant light side of the transparent substance, total reflection light 27 from the incident light 25 is abundant and the diffusion angle tends to become small, resulting in reduced transmittance and haze.

Figure 9:
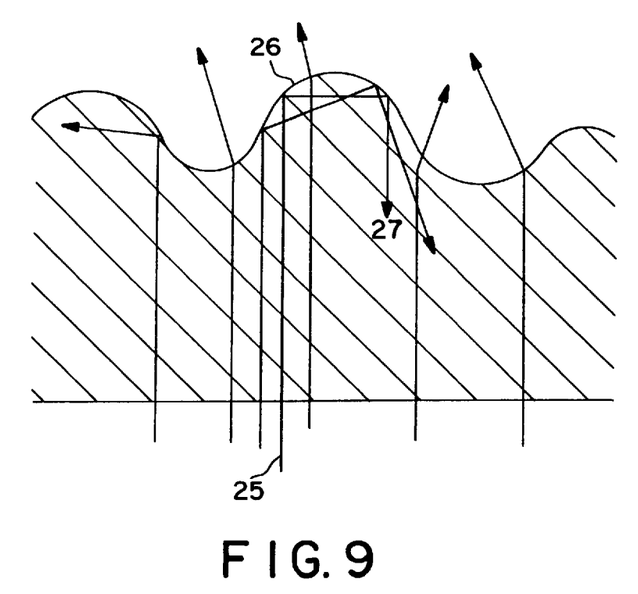
FIG. 9 is an illustration to explain theoretically how light rays pass from the flat surface to the diffusion surface with the use of the light transmission screen of Example 1.
Figure 10:
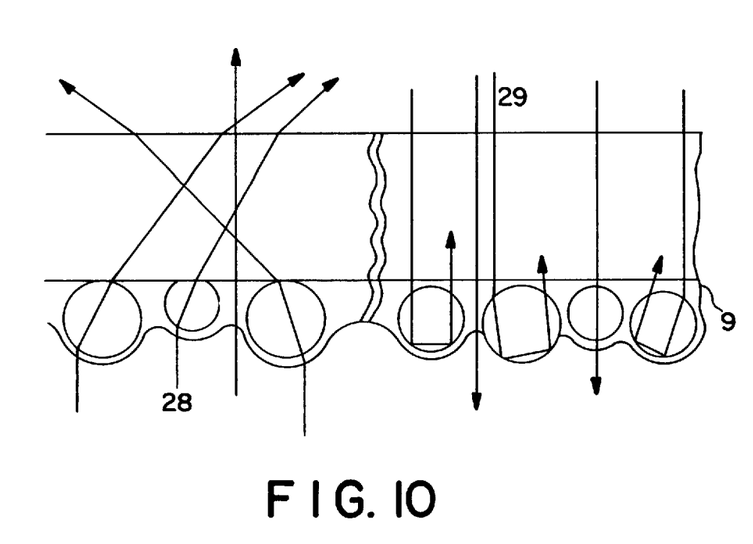
FIG. 10 is an illustration to show how light rays pass through the front diffusion panel of the light transmission screen of Example 1.
Figure 11:
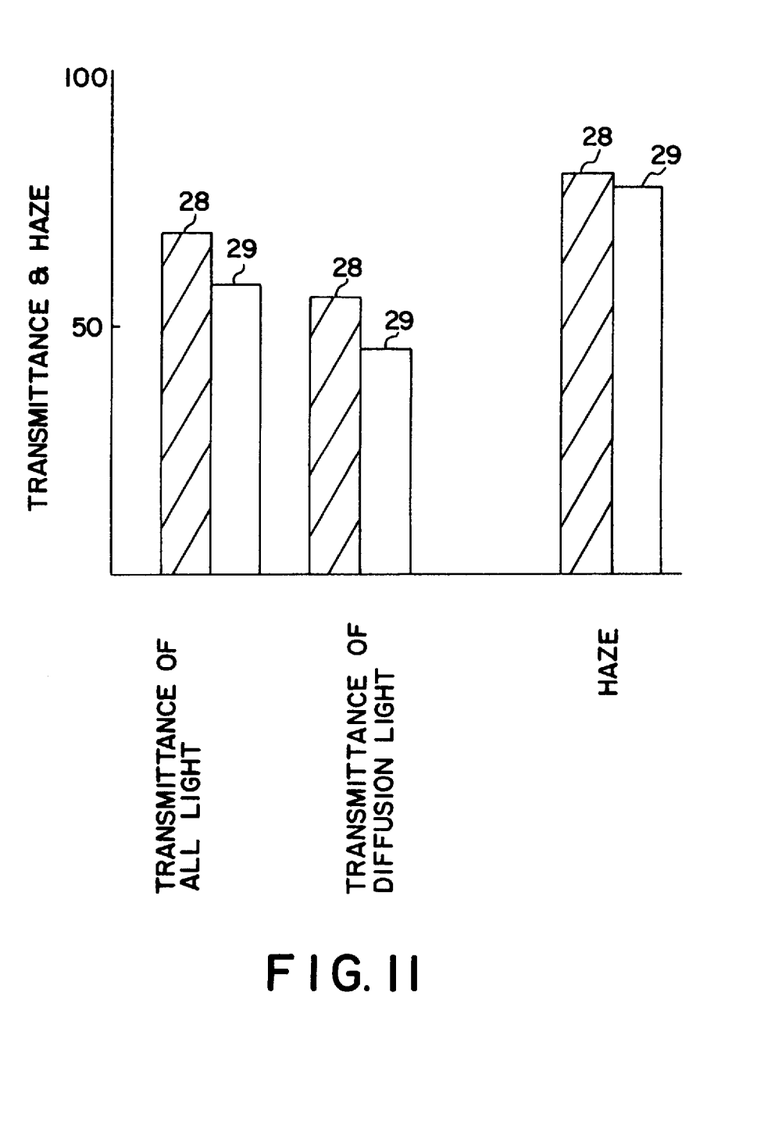
FIG. 11 is a diagram to show the evaluation results of the front diffusion panel used with the light transmission screen of Example 1.

An investigation conducted with a haze-meter on a front diffusion panel 3 structured according to the present example has revealed that an irregularly configured surface follows the theory illustrated by FIG. 8 and FIG. 9 when the front diffusion panel 3 is provided with a diffusion layer 9 uniformly covered with a diffusion material 8 thickness equal to the diameter of one particle of the diffusion material 8. The diffusion material is formed in fine particles, each of which is about 5 µm in diameter (the variation in the normal distribution thereof ranges from about 1 µm to 10 µm.) FIG. 10 and FIG. 11 show the transmittances and haze values measured for two scenarios: (1) the incident light 28 entering through the diffusion layer 9 and (2) the incident light 29 entering through the flat surface. As indicated in FIG. 11, the incident light 28 which enters through the diffusion surface shows higher values of light transmittance, diffusion light transmittance and haze than the values recorded when the incident light 29 enters through the flat surface. This is the same result as obtained theoretically in FIG. 8 and FIG. 9. In other words, by employing the structures wherein the diffusion layer 9 is disposed on the incident light side, better utilization of light by the front diffusion panel 3 is achieved.

The diffusion layer 9 does not necessarily have to be deposited uniformly, as illustrated in FIG. 2, to a thickness equal to the diameter of one fine particle of the diffusion material 8 that is being used. More specifically, a structure wherein the diffusion material 8 is deposited in a multi-layer configuration is also possible. Another possible structure for the diffusion layer 9 is one in which the diffusion material 8 is contained by dispersion in a transparent resin such as acrylic resin, polycarbonate resin, polyester resin, acrylstyrene copolymer, polysulfone or the like, thereby achieving the same effect as when the diffusion layer 9 is deposited uniformly, as discussed above.

Thus, with the lenticular lens sheet formed of a transparent material having no diffusion material content, improvements have been made in color shift, color shading, picture resolution, light utilization and the like.

In the prior art structures of FIG. 19, the position where the focused image 115 is situated, in the vicinity of the surface of the radiant light side lenticular lens 105, is lower than the surface of the external light absorption layer 106 by about 70 to 100 µm. This imposes a limitation on the horizontal view angle 117, which is set by the two light rays of the radiant light 112 situated at both extreme ends. As a result, all the external light rays outside of the area encompassed by the two radiant light rays 112 are blocked by the external light absorption layer 106, and the picture images from both the right and left edges do not reach the eyes of a viewer (imposing a limitation to the view angle).

Figure 7:
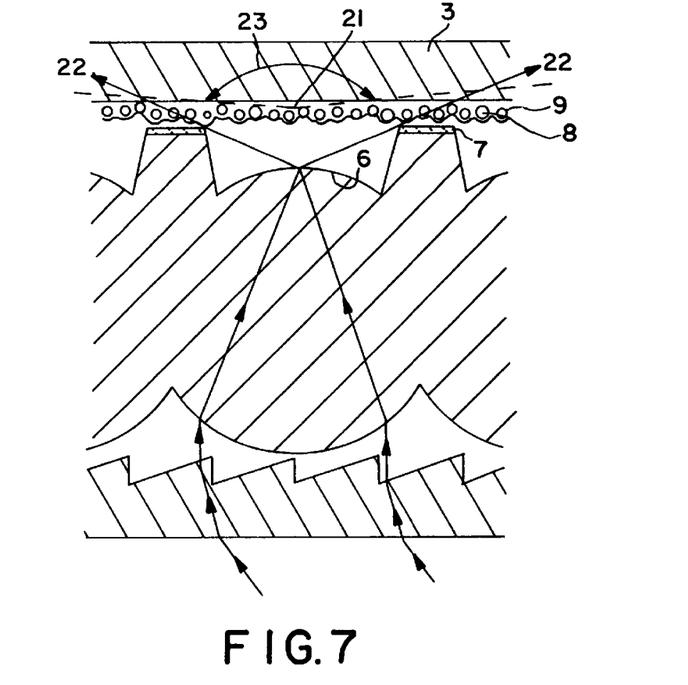
FIG. 7 is an illustration to show how the horizontal view angle is expanded with the use of the light transmission screen of Example 1.

In contrast, with the front diffusion panel 3 of the present example, a picture image 21 is focused on the diffusion layer 9 as illustrated in FIG. 7. No picture images are focused in the vicinity of the surface of the radiant light side lenticular lens 6. A focused picture image 21 is formed on the diffusion layer 9, and the radiant light 22 is blocked by the external light absorption layer 7. However, since the focused picture image 21 is situated on the back side of the front diffusion panel, the horizontal view angle 23 extends close to 180° in the same manner as with a direct-vision Braun tube.

Furthermore, by having a black material, which shows a uniform light absorption spectrum over the visible wavelength region, contained in at least one of the thin diffusion layer 9, transparent layer 10 and diffusion material 8, the external light reflection on account of the diffusion material 8 is eliminated, resulting in enhancement of the contrast against external light. For example, when a black color element, die or pigment is contained in 30% of the aforementioned layers, an improvement of 32% in the external light contrast by 32% is observed on the screen when external light of 360 Lux is irradiated. Also, in the structures which contain is a material showing selective wavelength characteristics in the visible wavelength region, the external light contrast is improved. In addition, in the structures wherein a diffusion material 8 dyed by a color pigment is used, the contrast against external light is improved.

In the front diffusion panel 3 as used in the present example, the vertical stripes formed on the lenticular lenses 5 and 6 and the external light absorption layer 7 are not seen by a viewer because of the existence of the diffusion layer 9.

Moreover, the other principal surface of the transparent layer 10 is situated at the position closest to a viewer, thereby constituting a flat mirror surface (a glossy surface) and enabling the realization of a clear picture. Also, the external light from ceiling illumination or the like is reflected obliquely downwards without getting to the eyes of the viewer, thereby contributing to improvement of the contrast against external light. It is, of course, possible to reduce the glare in the foregoing principal surface by having the surface roughened instead of mirror-finished.

Further, it is preferred that the aforementioned transparent layer 10 is about 1 to 5 mm thick. If the thickness is less than about 1 mm, the transparent layer 10 is not strong enough to withstand warping and also breaking. In cases where the thickness exceeds about 5 mm, the transparent layer 10 becomes heavier in weight and higher in cost.

The thickness of the Fresnel lens sheet 1 is about 1 to 3 mm, for example. The lenticular lens sheet 2 is about 0.5 to 2 mm thick, for example. With the present example, it is also possible to have the diffusion layer 9 disposed on the surface at the viewer's side (i.e., the radiant light side surface of the transparent layer 10).

Figure 14:
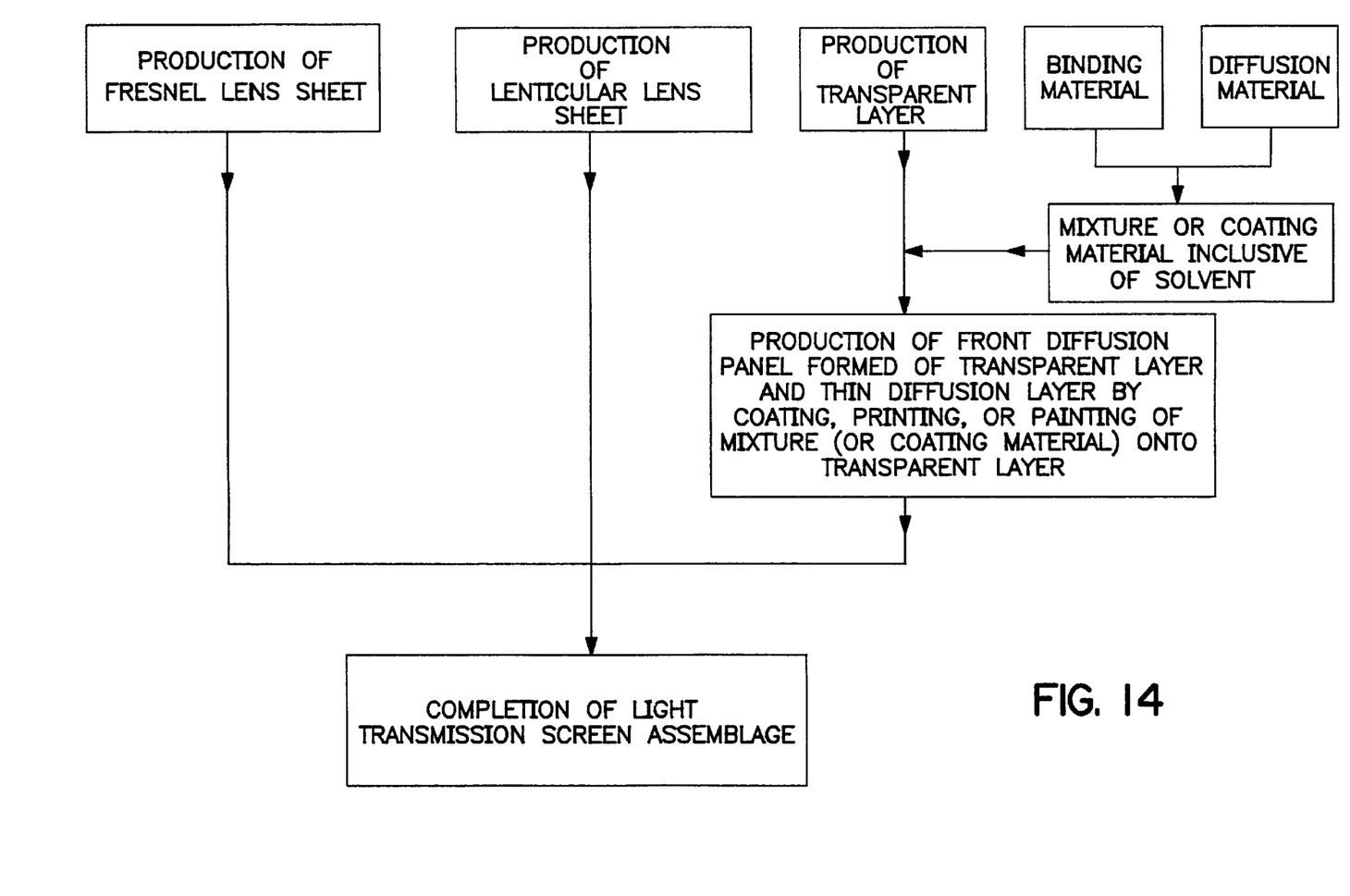
FIG. 14 is a block diagram to show a manufacturing method for a light transmission screen as an exemplary embodiment of the present invention.

Next, an exemplary embodiment of the manufacturing method for a light transmission screen of the present invention will be explained with the help of FIG. 14. A Fresnel lens sheet 1 is produced by a press molding successively performed by means of a flat type press machine or the like. A lenticular lens sheet 2 is produced by a continuous extrusion molding using a lens shape roll type or T-die type extrusion molding machine, or by a press molding successively performed by means of a flat type press machine. The Fresnel lens sheet 1 and lenticular lens sheet 2 are made of transparent resin materials such as acrylic resin, polycarbonate resin or the like, but no diffusion materials 8 are mixed with the transparent resin materials.

A manufacturing method for a front diffusion panel 3 will be described next. A diffusion layer 9 disposed on the light incident side surface of a transparent layer 10 is produced by such processing steps as printing, coating, transferring, painting and the like.

An explanation on screen printing is as follows:

The transparent layer 10 is prepared from a transparent plate formed of acrylic resin or the like. Separately from above, a mixture of a binder comprised mainly of a transparent material such as acrylic resin or the like and about 15% wt of a diffusion material 8 is prepared. Paints or inks which contain the same solvents as those in the foregoing mixture can also be used. Then, the above mixture is screen printed on the surface of the transparent plate by use of a screen printing plate of about 350 meshes. The diffusion layer 9 is thus formed by printing to a maximum thickness of around 12 $\mu$m. More specifically, the diffusion layer 9 is deposited to a thickness equivalent to the diameter of one particle of the diffusion material 8 which is, in turn, prepared so that each individual particle is uniformly dispersed throughout. The surface of each respective particle of the above is coated with a transparent binder of about a 1 to 2 $\mu$m thickness.

Next, the foregoing Fresnel lens sheet 1, lenticular lens sheet 2 and front diffusion panel 3 are arranged successively in this order for assembly. Thus, the light transmission screen is completed.

FIG. 7 shows an enlarged cross-sectional view of important portions of the finished light transmission screen. A beadlike material is used for the diffusion material and is made of a transparent resin material or the like having an average particle size of about 5 $\mu$m in diameter (with a particle diameter distribution ranging from 1 to 10 $\mu$m). Moreover, beads made of resins such as polystyrene, polycarbonate, acryl-styrene copolymer and the like, or glass can be used as the diffusion material 8.

The performance of the foregoing three-element light transmission screen comprising a front diffusion panel 3, Fresnel lens sheet 1 and lenticular lens sheet 2 has a gain of 5, a horizontal view angle of 50° at the ⅓ of maximum brightness position (referred to as BII hereafter) and a vertical view angle T=12° (11° in FIG. 15) at the ⅓ of maximum brightness position (referred to as $\beta$V hereafter). In contrast, the performance of the prior art screen as illustrated in FIG. 17 shows a gain of 4.7, a horizontal view angle of 45° and a vertical view angle of 11°.

The diffusion layer 9 is made so as to have a thickness of about 0.1 to 200 $\mu$m. Accordingly, a diffusion material having a particle size diameter of as large as 200 $\mu$m can be used, but when the printing plate, printing process, efficiency thereof and the like are taken into consideration, a particle size diameter of about 50 $\mu$m and less is preferred and as average particle diameter of about 5 $\mu$m is most desirable.

The printing method to be used is not limited to screen printing as other printing methods such as gravure printing, offset printing, roll coat printing or the like can also be used. Based on the printing method used, the particle size and mixture ratio of the diffusion material are selected in the most appropriate manner, and the printing is to be performed under the optimum printing conditions.

It is also possible to manufacture the front diffusion panel by appropriate processing methods other than the above. For example, a diffusion material 8 may be applied in advance to the surface of a polyethyleneterephuthalate (PET) film by coating or painting, and the attached diffusion material 8 can be transfer printed on one of the principal surfaces of the transparent layer 10 by hot stamping or pressing.

EXAMPLE 2

Figure 12:
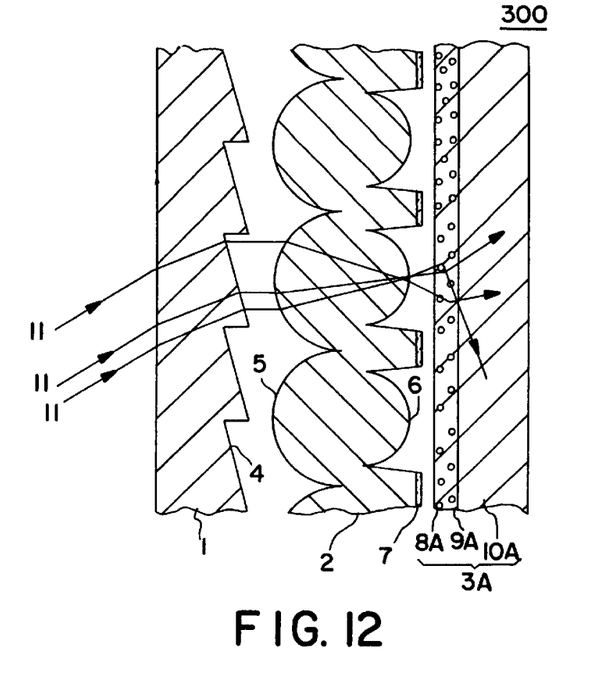
FIG. 12 is a cross-sectional view of a section of a light transmission screen as a second exemplary embodiment (Example 2) of the present invention.

A second exemplary embodiment of a light transmission screen of the present invention will be explained with the help of FIG. 12. FIG. 12 is a cross-sectional view of an important portion of the light transmission screen of the second exemplary embodiment. The light transmission screen 300 differs greatly in structure from the light transmission screen 200 as described in Example 1 by having a diffusion material 8A, which is contained in a diffusion layer 9A, mixed by dispersion in multiple layers. The elements other than the above are the same as those in the light transmission screen 200 of Example 1 as illustrated in FIG. 1.

The optimum average particle size of a diffusion material 8A is about 15 $\mu$m in diameter (with the normal distribution of particle size ranging from about 5 to 25 $\mu$m in diameter). The thickness of a diffusion layer 9A ranges from about 5 to 200 $\mu$m. The light transmission screen 300 thus structured performs almost the same as the light transmission screen 200 described in Example 1.

With the present example, an extrusion molding process is used as the manufacturing method for the front diffusion panel 3A. The foregoing process will be explained with the help of FIG. 15.

Figure 15:
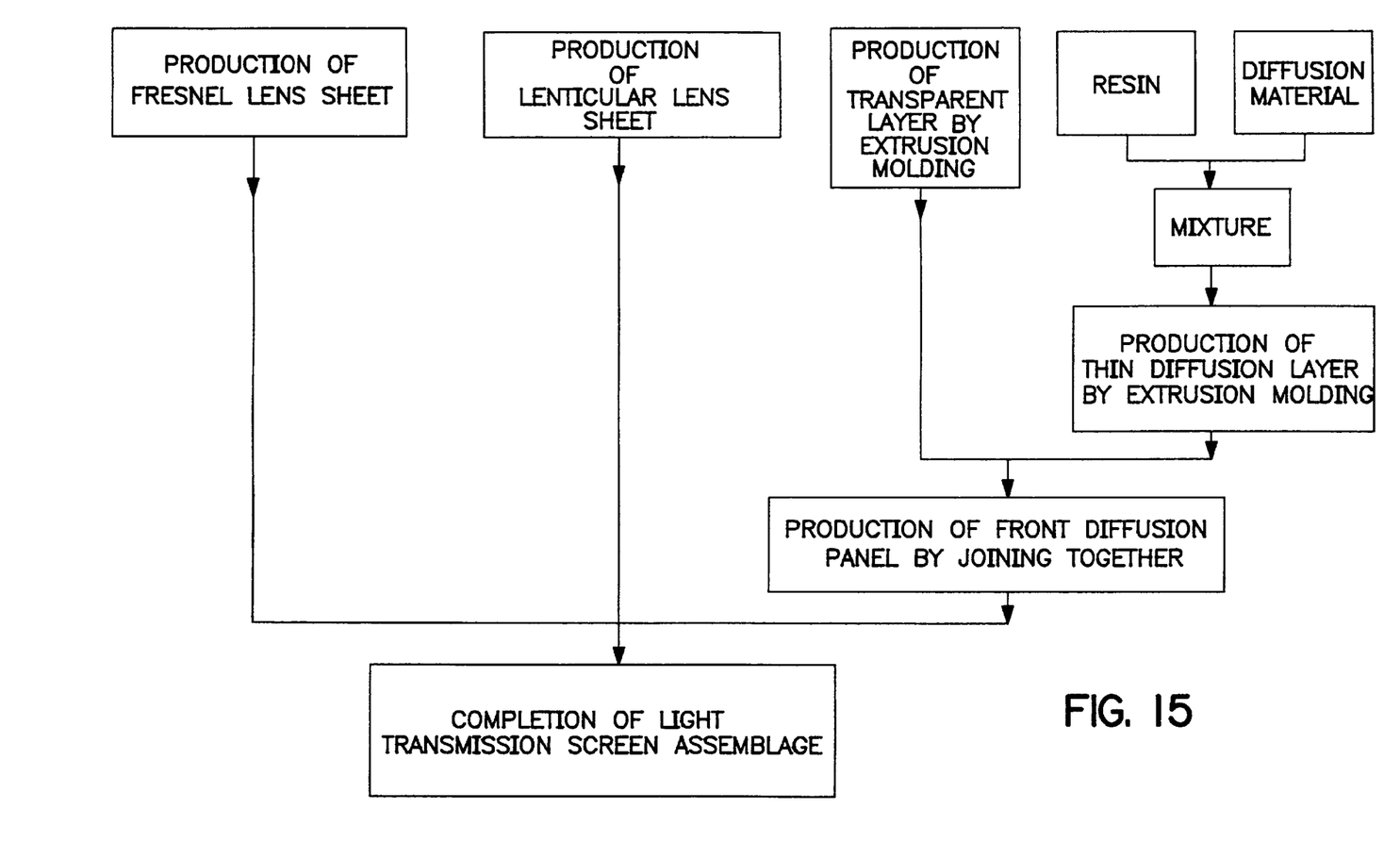
FIG. 15 is a block diagram to show a manufacturing method for a light transmission screen as another exemplary embodiment of the present invention.

First, a mixture of a diffusion material and a transparent resin-like acrylic resin is extrusion molded to produce the diffusion layer 9A. Separately from above, a transparent resin-like acrylic resin is extrusion molded to produce a transparent layer 10A. Then, both of these are joined together during the extrusion molding process or through a separate process.

Another manufacturing method for the front diffusion panel 3A may be employed. This method comprises the steps of first producing a diffusion layer 9A made of a film sheet about 0.1 to 0.2 mm thick, dispersed uniformly with a diffusion material in multiple layers, and then extrusion molding a transparent layer 10A on the foregoing film sheet. Finally the two layers, the diffusion layer 9A and transparent layer 10A are joined together using an adhesive.

The methods for producing the Fresnel lens sheet 1 and lenticular lens sheet 2 are the same as employed in Example 1. The Fresnel lens sheet 1, lenticular lens sheet 2 and front diffusion panel 3A are arranged successively in this order for assembly to complete the light transmission screen 300. Thus, the diffusion panel used to constitute the light transmission screen 300 can be readily produced inexpensively using a conventional manufacturing method and conventional equipment.

Moreover, with Example 2, the particle diameter size of the diffusion material ranges from about 5 to 25 Am and it is desirable to use a diffusion material with uniform size particles. The diffusion layer 9A may be positioned anywhere in the front diffusion panel 3A, and is not necessarily limited to the side of the lenticular lens sheet 2. For example, the diffusion layer 9A can also be formed on the viewer's side surface (i.e., the light radiant side surface of the transparent layer 10A).

EXAMPLE 3

Figure 13:
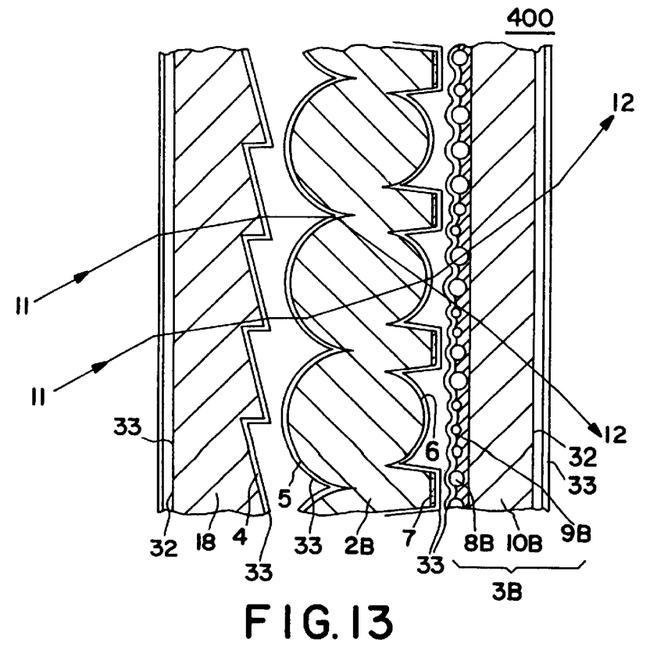
FIG. 13 is a cross-sectional view of a section of a light transmission screen as a third exemplary embodiment (Example 3) of the present invention.

A third exemplary embodiment of a light transmission screen 400 of the present invention will be explained with the help of FIG. 13. FIG. 13 is a cross-sectional view of an important portion of the light transmission screen of the third exemplary embodiment. The third exemplary embodiment is characterized by having an antistatic means and an antireflection means incorporated for the purposes of improving external light contrast, eliminating the reflection shown at the screen's face plate, achieving clear pictures on the screen due to the elimination of dust and dirt, and the like.

The antistatic means that are used include an antistatic film or layer, an antistatic agent, an antistatic plate containing an antistatic agent, and the like. The antireflection means that are used include an organic plastic material, an inorganic material or the like. A film or layer made of a material with a low refractive index is particularly preferred.

As shown in FIG. 13, an antistatic film 32 disposed on the incident light side surface of the Fresnel lens sheet 1B and also on the principal surface of the diffusion panel 3 located closest to a viewer contributes to the elimination of dust and dirt which may have become attached to the foregoing surfaces due to static electricity.

Further, an antireflection film 33 disposed on at least one of the surfaces of the Fresnel lens sheet 1B, the lenticular lens sheet 2B and the diffusion panel 3B contributes to an improvement in external light contrast and the display of pictures having no reflection on the screen's face plate.

By having an antireflection film formed on all the surfaces of the Fresnel lens sheet 1B, the lenticular lens sheet 2B and the diffusion panel 3B, particularly excellent antireflection effects are realized.

First, an antistatic layer 32 is disposed on the specified surfaces of the Fresnel lens sheet 1B and the diffusion panel 3B, respectively. Then, an antireflection film 33 is disposed on at least one of the foregoing surfaces where the antistatic film 32 has been formed. With the above structures, the static electricity charges produced on the surface of the antireflection film 33 due to friction or an electric field are eliminated.

The use of the antireflection film 33 is based on the theory of the interference effect of light: by having the film thickness made equal to $\lambda/(4n)$ [where $\lambda$: wavelength of light, n: refractory index of the film material], the reflection of light having a wavelength of $\lambda$ is reduced and the transmittance thereof is increased.

The antireflection film employed with the present example is a transparent resin composite of fluorine family (Asahi Glass Co.'s CYTOP, n=1.34) having a refractory index which is lower than that of the transparent resin materials used as the base material for the screen (for example acrylic resin (n=1.49), polycarbonate (n=1.57), polystyrene (n=1.59), acrylstyrene copolymer (n=1.51 to 1.57) and the like].

The surface resistance of the aforementioned CYTOP material is as extremely large as $10^{16}$ ohms, and is the same as that of the base material for the screen. Therefore, when the air is dry and friction with other materials takes place, static electricity is readily generated. Once electrostatic charges are produced, the charges do not decay for a long period of time. Normally, when an antistatic film with surface resistance ranging from $10^{11}$ to $10^{12}$ ohms is disposed on the foregoing screen base material, the electrostatic charges produced thereon decay in a short period of time, about 1 to 2 seconds. However, in the case of the present example where an antireflection film of high surface resistance is formed on the surface of an antistatic film, it is known that the static electricity charges cannot be removed in a short period by means of a conventional antistatic treatment. Various experiments have been attempted to solve the foregoing problem. As a result, it has been determined that no static electricity charges are produced, or even if these charges are produced, they decay by half or totally in 1 to 2 seconds, by making the thickness of the antireflection film less than $\lambda/(4n)$ and the surface resistance less than $10^{10}$ ohms.

Various resin materials which already incorporate an antistatic provision are available in the market. Thus, it is possible to fabricate structures using a resin plate or resin material having surface resistance of $10^{10}$ ohms or less, having the surface of the antistatic film thereof has a coating of an antireflection film made of a metal oxide of low refractory index, an inorganic material, a surfactant or the like.

When a coating of the CYTOP thin film is applied to a resin plate having an antistatic provision, adhesion of the coating is not strong and even wiping the surface softly with a cloth causes the CYTOP thin film to peel off easily, thereby creating a problem. For example, a rubbing test of wiping two to three times with a 500 g force causes the CYTOP thin film to peel off. To prevent this by strengthening the adhesion of the CYTOP thin film, it is possible to use a treatment such as a silane coupling treatment, an activated energy treatment, a primer treatment or the like. Using the foregoing treatments, the adhesion strength is increased by as much as 10 times.

Further, when the antistatic agent used is ELCOM [Shokubai-Kasei Co.'s brand name for a specific purpose printing ink comprising $SnO_2$, vinyl acetate chlorinated resin and cyclohexane-ethyl acetate cellulose solvent, surface resistance=$10^7$ to $10^8$ ohms], the adhesion strength of the CYTOP thin film is increased by 100 times (the CYTOP thin film peeled off after 250 to 300 times of a rubbing test) without any generation of static electricity.

The foregoing antistatic material can be applied by means of a screen printing method, for example. The coating film thickness is about 0.1 to 3 $\mu$m.

In the production of the diffusion panel 3B, a transparent layer 10B is first applied by printing to the light incident side surface of the diffusion layer 9B, and then ELCOM as an antistatic material is applied by printing to the radiant light side surface of the transparent layer 10B. Thus, an antistatic film 32 is formed. At this time, it is also possible to first apply the antistatic film 32 by printing, and then apply the diffusion layer 9B.

After the foregoing antistatic material treatment, the antireflection film 33 is disposed on a specified surface to a thickness of $\lambda/(4n)$ by means of a dip coating method, for example. All three basic materials which constitute the light transmission screen 400 are applied with the antireflection layer 33 on the respective surfaces thereof. However, it is also possible to employ structures wherein at least one of the screen's basic materials is not applied with the antireflection film 33 with the same resultant effect as above.

Table 1 shows a comparison of performance between the light transmission screen of the present invention and that of the prior art. In Table 1, $\alpha$ is the view angle at the ½ of the center brightness position, $\beta$ is the view angle at ⅓, $\gamma$ is the view angle at ⅕ and $\delta$ is the view angle at the 1/10 of the center brightness position.

Table 1 shows how the following features of the light transmission screen of the present invention compare with that of the prior art:

The gain and external light contrast are high.

The vertical view angle and horizontal view angle are expanded.

The color shift is reduced to about one half.

The shading is reduced to about one fourth.

TABLE 1

| | Test Item | Prior Art Screen | Present Invention's Screen | Result |
|---|---|---|---|---|
| | Gain | 2.12 | 2.33 | 10% Increase |
| | External Light Contrast | 1:28.1 | 1:33.0 | 15% Increase |
| Vertical View Angle | $\alpha$ (1/2) | 8.9° | 10.3° | 16% Increase |
| | $\beta$ (1/3) | 12.4° | 14.0° | 13% Increase |
| | $\gamma$ (1/5) | 16.6° | 17.6° | 6% Increase |
| | $\delta$ (1/10) | 23.0° | 22.7° | 1% Decrease |
| Horizontal View Angle | $\alpha$ (1/2) | 35.5° | 38.4° | 8% Increase |
| | $\beta$ (1/3) | 40.8° | 47.3° | 16% Increase |
| | $\gamma$ (1/5) | 44.0° | 55.0° | 25% Increase |
| | $\delta$ (1/10) | 51.0° | 66.0° | 29% Increase |
| | Color Shift | −7.8 to 4.9 | −4.9 to 2.6 | Approx. 50% Better |
| | Shading | 12000° K. | 3000° K. | 75% Better |

What is claimed:

1. A manufacturing method for a light transmission screen comprising the steps of:
    (a) producing a Fresnel lens sheet;
    (b) producing a lenticular lens sheet;
    (c) producing a front diffusion panel comprising the steps of:
        (1) producing a transparent plate;
        (2) disposing a diffusion layer on a surface of said transparent plate by applying thereto a mixture of a binder and a light diffusing diffusion material by means of one method selected from printing, transferring, coating and painting; and
    (d) assemblying said Fresnel lens sheet, said lenticular lens sheet and said front diffusion panel.

2. A manufacturing method for a light transmission screen comprising the steps of:
    (a) producing a Fresnel lens sheet;
    (b) producing a lenticular lens sheet;
    (c) producing a front diffusion panel by joining a diffusion layer, which has been produced by extrusion molding a mixture of a diffusion material and a first transparent resin, and a transparent resin sheet, which has been produced by extrusion molding a second transparent resin; and
    (d) assemblying said Fresnel lens sheet, said lenticular lens sheet and said front diffusion panel.

3. A manufacturing method for a light transmission screen according to claim 2, wherein said step of producing said front diffusion panel further comprises the steps of:
    (1) producing said diffusion layer by extrusion molding said mixture of said diffusion material and said first transparent resin;
    (2) producing said transparent resin sheet by extrusion molding said second transparent resin; and
    (3) producing said front diffusion panel by joining said diffusion layer and said transparent resin sheet.

4. A manufacturing method for a light transmission screen according to claim 2, wherein said step of producing said front diffusion panel further comprises the steps of:
    (1) producing said diffusion layer in a film sheet form by extrusion molding said mixture of said diffusion material and said first transparent resin; and
    (2) disposing said second transparent resin after extrusion molding on the surface of said diffusion layer in said film sheet form; and
    joining said diffusion layer and said transparent resin.

* * * * *